(12) United States Patent
Voth et al.

(10) Patent No.: US 8,684,716 B2
(45) Date of Patent: Apr. 1, 2014

(54) BLOW MOULDING MACHINE WITH PIVOT SHAFTS GUIDED ON SLIDE BEARINGS

(75) Inventors: Klaus Voth, Obertraubling (DE); Oliver Martini, Thun (CH); Florian Geltinger, Donaustauf (DE); Ulrich Lappe, Regensburg (DE); Michael Neubauer, Regensburg (DE); Juergen Soellner, Beratzhausen (DE); Frank Winzinger, Freising (DE); Josef Hausladen, Woerth an der Donau (DE)

(73) Assignee: Krones AG (DE)

( * ) Notice: Subject to any disclaimer, the term of this patent is extended or adjusted under 35 U.S.C. 154(b) by 64 days.

(21) Appl. No.: 13/489,292

(22) Filed: Jun. 5, 2012

(65) Prior Publication Data
US 2012/0321741 A1 Dec. 20, 2012

(30) Foreign Application Priority Data
Jun. 16, 2011 (DE) .......................... 10 2011 106 572

(51) Int. Cl.
*B29C 49/42* (2006.01)
(52) U.S. Cl.
USPC ........................................... 425/73; 425/541
(58) Field of Classification Search
USPC ................................................. 425/73, 541
See application file for complete search history.

(56) References Cited

U.S. PATENT DOCUMENTS

| 3,896,036 A * | 7/1975 | Cairns ........................... 508/104 |
| 4,208,852 A * | 6/1980 | Pioch ............................. 425/535 |
| 2012/0225158 A1 * | 9/2012 | Voth et al. ...................... 425/540 |

FOREIGN PATENT DOCUMENTS

| EP | 1535719 | 10/2004 | ............. B29C 49/56 |
| WO | WO2010/020529 | 2/2010 | ............. B29C 49/36 |

OTHER PUBLICATIONS

German Search Report issued in DE 10 2011 106 572.9 dated Apr. 2, 2012 (5 pgs).
SKF: Composite Gleitlager-Wartungsfrei und platzparend. Feb. 2006 (29 pgs).

* cited by examiner

*Primary Examiner* — Robert B Davis
(74) *Attorney, Agent, or Firm* — Hayes Soloway P.C.

(57) ABSTRACT

An apparatus for shaping plastics material pre-forms into containers has a plurality of blow molding stations arranged on a movable carrier The blow molding stations have two part blow molds with a cavity inside in which the plastics material pre-forms are expanded. The blow molding stations have stressing devices which act upon the plastics material pre-forms to expand them with a flowable medium. At least one first bearing device is provided for movable mounting of the blow mold carriers with respect to each other and at least one second bearing device is provided for movable mounting of the first locking element with respect to the second locking element. At least one of these bearing devices is a slide bearing without lubricant or a bearing which is injection molded at least in part from a plastics material between bearing parts movable relative to each other.

10 Claims, 6 Drawing Sheets

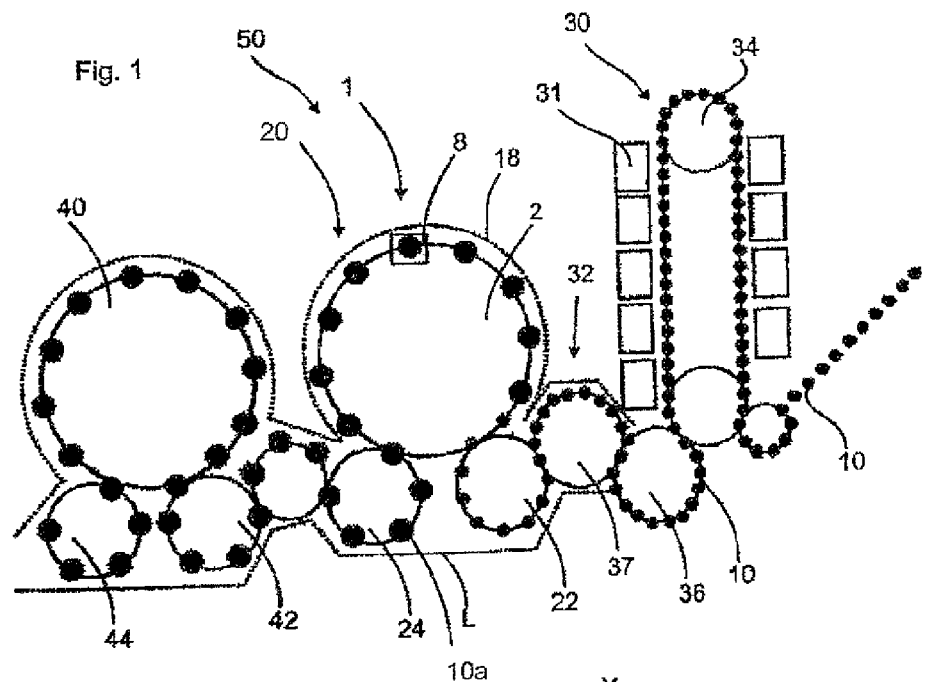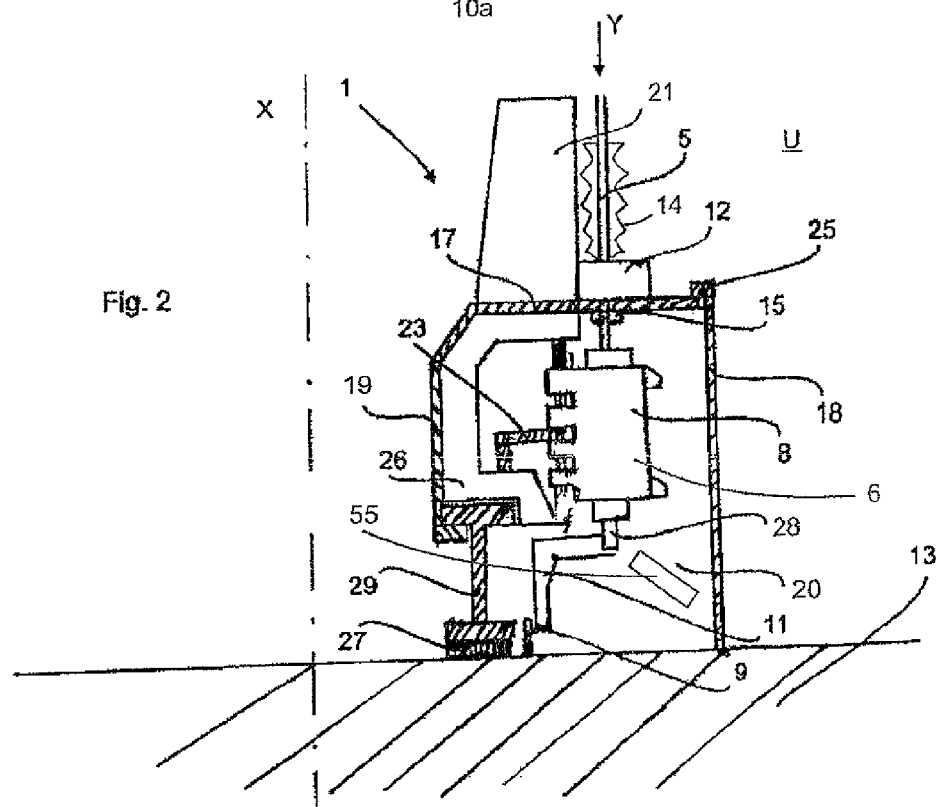

BLOW MOULDING MACHINE WITH PIVOT SHAFTS GUIDED ON SLIDE BEARINGS

BACKGROUND OF THE INVENTION

The present invention relates to an apparatus for the shaping of plastics material pre-forms into plastics material containers. Apparatus of this type are known from the prior art. In this case for example stretch blow moulding machines are known in which the plastics material pre-forms are blow moulded to form plastics material containers by the application of an internal pressure in a plurality of blow moulding stations. Each of these blow moulding stations usually has two mould carrier parts, to which the blow moulds or blow mould parts are fastened. A heated plastics material pre-form is blown out in these blow moulds with the aid of compressed air and is shaped to form a plastics material container.

In order to remove the containers produced and to introduce a new plastics material pre-form, it is necessary for the two mould carriers to perform an opening movement. It is usual in this case for at least one of the mould carrier parts to be pivoted about an axis, or even for the two mould carriers to be pivoted about a common axis.

Blow moulding machines of this type are also, however, known from the prior art, in which the blow moulding stations are conveyed in clean rooms in order to permit an aseptic blow moulding procedure in this way. WO 2010 020529 A2 describes a blow moulding machine of this type The subject matter of the WO is hereby also made the subject matter of the present application in its entire scope.

In addition, it is known from the prior art for the blow moulds to be locked during the blow moulding procedure. In this case it is known for example for a locking element pivotable on a blow mould carrier part to engage in a locking element arranged on another blow mould carrier part and thus for the blow mould to be securely locked during the expansion procedure in which very high pressures or forces act upon the blow mould carriers.

Numerous types of bearings are known at present. In this way, it is known for example for a bearing, such as for example a needle bearing, to be re-lubricated in a cyclical manner by way of a lubrication nipple and a distributor line. This leads, however, to the possible escape of grease and to a higher maintenance outlay, and this, in particular, is not suitable for use in sterile blow moulding machines.

In addition, hybrid bearings with for example ceramic and steel components which can operate dry are known from the prior art. Bearings of this type, however, can be used only with low loads and they involve high costs on account of the materials.

OBJECT OF THE INVENTION

The object of the present invention is therefore to improve the mounting of the movable parts, and in particular the parts movable in a pivoting manner, for blow moulding machines of this type for shaping plastics material pre-forms into plastics material containers.

SUMMARY OF THE INVENTION

An apparatus according to the invention for the shaping of plastics material pre-forms into plastics material containers has a plurality of blow moulding stations which are arranged on a movable carrier. In this case the blow moulding stations have blow moulds which are formed in each case from two blow mould parts or have two blow mould parts and which in their interior form a cavity inside which the plastics material pre-forms are capable of being expanded. In addition, the blow moulding stations have in each case stressing devices which act upon the plastics material pre-forms (in particular a clean room thereof) in order to expand them with a flowable medium, the blow mould parts being arranged in each case on blow mould carriers and the blow mould carriers being movable with respect to one another in order to open and close the blow mould and the blow moulding stations having a locking mechanism in order to lock the blow mould carriers together in a closed state, and this locking mechanism has a first locking element and a second locking element which is movable with respect to the first locking element.

According to the invention at least one first bearing device is provided for the movable mounting of the blow mould carriers with respect to each other and/or at least one second bearing device is provided for the movable mounting of at least one locking element, and at least one of these bearing device[s] is designed in the form of a slide bearing without lubricant or in the form of a bearing which is injection moulded at least in part from a plastics material between bearing parts movable relative to each other.

An improvement of the bearing devices is thus proposed according to the invention. In the case of a variant according to the invention, slide bearings are used as the bearings. These slide bearings have a high static loading capacity which is of major importance for the application in question since the greatest loading upon these bearings occurs during the actual blow moulding procedure, i.e. in a closed state of the blow mould. The bearing itself is not moved during the occurrence of these high loads.

A further advantage in the use of the slide bearing lies in a comparatively small structural space and also in the fact that a dry operation is possible. In addition, it is possible for the respective recyclable materials of the slide bearing to be capable of being authorized in terms of food regulations by the FDA (Federal Drug Administration). In addition, these bearings also afford the advantages that the apparatus is capable of being cleaned and sterilized in a highly satisfactory manner.

In an advantageous embodiment the apparatus has a clean room inside which the blow moulding stations are conveyed and this clean room is separated from the environment by at least one wall. In this way, it would be possible for the entire apparatus to be situated inside the aforesaid clean room. It is preferable, however, for this clean room to be designed in such a way that it surrounds the conveying path of the individual blow moulding stations in the manner of a duct.

It is advantageous for the movable carrier to be a blow moulding wheel which rotates about a pre-set axis of rotation and on which a plurality of the aforesaid blow moulding stations are arranged.

In the case of an advantageous embodiment the clean room has in this case a plurality of walls for separating the clean room from the environment. In this case it is advantageous for at least two walls to be arranged so as to be movable with respect to each other. In the case of a further advantageous embodiment it would also be possible for one or more walls to be formed by the conveying device or the movable carrier itself. In this case it is possible for a sealing device to be used in order to seal off from one another walls which are movable towards one another or with respect to one another. In this case the sealing devices used is in the form of a so-called surge chamber for example.

In the case of a further advantageous embodiment at least one blow mould carrier is pivotable with respect to a pre-set pivot axis and the first bearing device is used for supporting this pivoting movement. This pivot shaft can be for example a main shaft of the apparatus.

In the case of a further advantageous embodiment at least one locking element is mounted so as to be pivotable with respect to a second pivot axis and the second mounting device is used for supporting this pivoting movement with respect to the second pivot axis. In this way, it is possible for a locking element to be arranged for example so as to be pivotable on a blow mould carrier part and for the aforesaid bearing device to be used for supporting this pivoting movement.

It would be possible in this case for the slide bearings to have in each case a smooth inner face in order to simplify cleaning and sterilization. It would also be possible, however, for at least one mounting to have on at least one bearing face a recess or—generally—an uneven portion. Recesses or uneven portions of this type which can be designed for example in the form of grooves or apertures, can be provided for example on an inner and or outer face of the bearing. On account of these grooves for example the cleaning and sterilization of the bearing device can be simplified since a sterilization agent can flow through these grooves.

In the case of a further advantageous embodiment at least one bearing device has a plastics material as the material of the slide bearing. It would also be possible for at least one material of at least one bearing device to be chosen from a group of plastics materials which contains thermoplastic plastics materials, thermosetting plastics materials, metallic materials, combinations thereof or the like.

It would also be possible for a plurality of bearing devices of the apparatus, such as for example both the mounting for the pivoting movement of the blow mould carriers and the mounting for the locking element to be designed in the manner outlined above.

In the case of a further advantageous embodiment a lubricant for the bearing device is contained in at least one plastics material which acts as a material for at least one bearing device. In this way, it would be possible for example for a bearing to be used in which the cavities which are usually filled with grease are injection-moulded with a material based on plastics material. This can be carried out for example by an injection procedure. It is advantageous for the plastics material used in this case to be a thermoplastic plastics material. A predominant portion of the lubricant can be contained in this thermoplastic plastics material. This leads to the thermoplastic plastics material acting as a sponge which delivers the lubricant continuously over time.

In the case of this embodiment it would be possible for any desired roller bearings to be used in principle and then to be injected in a method such as for example the injection-moulding procedure with the thermoplastic plastics material impregnated with lubricant. The advantage of this application lies in the low costs and the unchanged size of the structural space used. In addition, an advantageous lubrication is possible since the above-mentioned "sponge" almost completely encloses possible roller bodies of the bearing. Also, this embodiment of the bearing device is suitable in particular for sterile or aseptic applications as well.

In the case of a further advantageous embodiment at least one bearing device acts as a radial bearing and/or as an axial bearing. In this case it is preferably possible for the bearing to be able to absorb forces both in the axial direction and in the radial direction. In this way, the bearing can also be designed in the form of a flange bushing for example.

In the case of a further advantageous embodiment the slide bearing can also comprise two or more materials which are glued, sintered, sprayed or the like onto each other. It would also be possible, however, for the slide bearing or the bearing device to consist of only a single material.

In the case of a further advantageous embodiment it is possible for the bearing device to have a flowable sterilization agent flow through it. This application is important in particular for aseptic applications. In this case it would be possible for the sterilization agent to flow for example through the grooves or recesses respectively mentioned above.

BRIEF DESCRIPTION OF THE DRAWINGS

Further advantages and embodiments are evident from the accompanying drawings. In the drawings FIG. 1 is a diagrammatic illustration of a plant for producing plastics material containers;

FIG. 2 is a view of a clean room in the region of a blow moulding station;

DETAILED DESCRIPTION OF THE INVENTION

Figure 3:
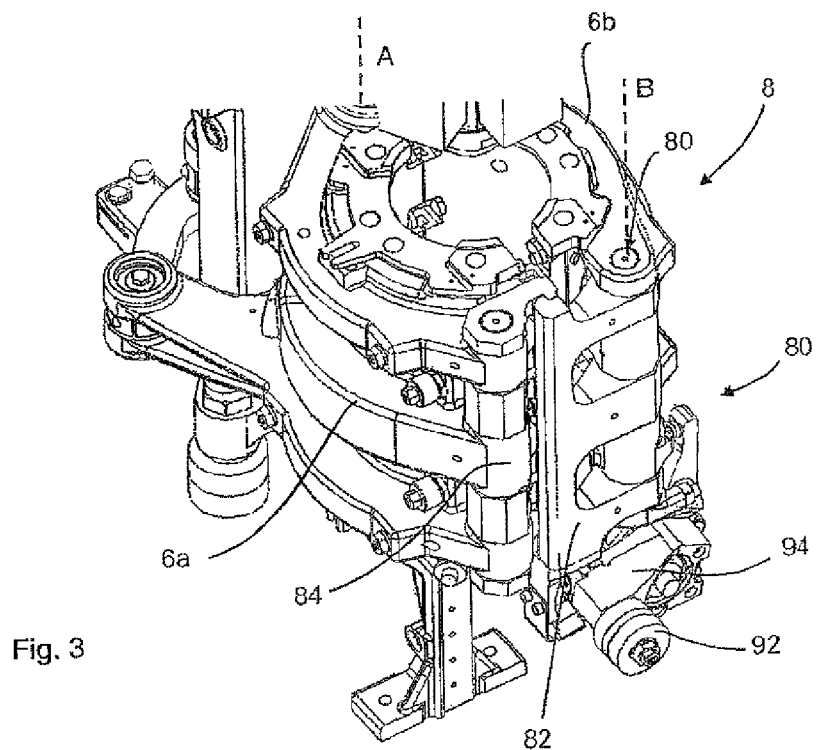
FIG. 3 is a perspective illustration of a blow moulding station.

FIG. 1 is a diagrammatic illustration of a plant or producing plastics material containers according to the prior art. This plant 50 has a heating device 30 in which plastics material pre-forms 10 are heated. In this case these plastics material pre-forms 10 are conveyed through this heating device 30 by means of a conveying device 34, such as a circulating chain here, and are heated in this case by a plurality of heating elements 31 This heating device 30 has attached to it a transfer unit 36 which transfers the pro-forms 10 to a sterilization device 32. This sterilization device 32 likewise has in this case a conveying wheel 37 and sterilization elements can be arranged on this conveying wheel 37 or even in a stationary manner. Sterilization by hydrogen peroxide gas or even by electromagnetic radiation is possible for example in this region. In particular, an internal sterilization of the pre-forms is carried out in this region.

The reference number 20 designates in its entirety a clean room, the external boundaries of which are indicated here by the dotted line L. In a further preferred embodiment the clean room 20 is not only arranged in the region of the conveying wheel 2 and the filling device 40, but it already starts if possible in the region of the heating device 30, the sterilization device 32, the supply of the plastics material pre-forms and/or the production of the plastics material pre-forms. It is evident that this clean room 20 starts in the region of the sterilization unit 32. Separating-out devices can be provided in this region in order to introduce the plastics material pre-forms into the clean room 20 without too much gas flowing inside the clean room in this case and thus being lost.

As indicated by the broken line L, the clean room is adapted to the external shape of the individual components of the plant. In this way the volume of the clean room can be reduced.

The reference number 1 designates a shaping apparatus as a whole, in which a plurality of blow moulding stations or shaping stations 8 are arranged on a conveying wheel 2 only one of these blow moulding stations 8 being shown here. The plastics material pre-forms 10 are expanded by these blow moulding stations 8 to form containers 10*a*. Although it is not shown in detail here, the entire area of the conveying device 2 is not situated inside the clean room 20, but the clean room 20 or isolator is designed as it were in the form of a mini isolator inside the apparatus as a whole. In this way it would be possible for the clean room to be designed in the form of a duct at least in the region of the shaping apparatus 1.

The reference number 22 relates to a supply device which transfers the pre-forms to the shaping device 1, and the reference number 24 relates to a removal device which removes the plastics material containers 20 produced from the shaping apparatus 1. It will be seen that in the region of the supply device 22 and the removal device 24 the clean room 20 has recesses in each case which receive these devices 22, 24. In this way, a transfer of the plastics material pre-forms 10 to the shaping apparatus 1 or a transfer of the plastics material containers 10*a* from the shaping apparatus 1 can be carried out in a particularly advantageous manner.

The expanded plastics material containers are transferred to a filling device 40 by a transfer unit 42 and they are then removed from this filling device 40 by way of a further conveying unit 44. In this case the filling device 40 is also situated inside the aforesaid clean room 20. In the case of the filling device it would also be possible for the entire filling device 40 with for example a reservoir for a beverage not to be arranged completely inside the clean room 6, but also in this case only those areas in which the containers are actually guided. In this respect, it would also be possible for the filling device to be designed in a similar manner to the apparatus 1 for shaping plastics material pre-forms 10.

As mentioned, the clean room 20 is reduced in the region of the apparatus 1 to as small an area as possible, namely essentially to the blow moulding stations 8 themselves. As a result of this compact design of the clean room 20 it is possible in an easier and more rapid manner to produce a clean room generally and, in addition a lower outlay is required in order to keep the system sterile in the operative phase. Less sterile air is also necessary, and this leads to smaller filter units and the risk of uncontrolled swirl formation is also reduced.

FIG. 2 is a detailed illustration of the apparatus 1 in the region of a blow moulding station 8. A plurality of blow moulding stations 8 of this type are moved by a conveying device 2 or a carrier so as to rotate about an axis X. As is evident from FIG. 2, the blow moulding station 8 is guided inside the clean room 20 which is designed in the form of a duct here. This clean room 20 is closed off by a movable lateral wall 19 and a cover 17 formed in one piece with this lateral wall 19. In this case this lateral wall 19 and the cover 17 rotate jointly with the blow moulding station 8.

The reference number 18 relates to a further wall which bounds the clean room 6. This wall 18 is here a wall which is situated on the outside and which is arranged in a stationary manner. The cover 17 and the wall 18 have provided between them a sealing device 25 which seals off from each other the elements 17 and 18 movable with respect to each other, for example, as mentioned above, by using a surge chamber. The lower region of the wall 18 is arranged on a floor 13 in a fixed and sealed manner. A carrier 26, which likewise moves in a rotating manner and on which a holding device 23 which holds the blow moulding station 8 is in turn provided, is provided inside the clean room 20 and in this case abutting directly against the wall 19.

The reference number 11 relates to a follower device which can be actuated by a guide cam 9 in order to open and close the blow moulding station on its path through the clean room 6, in order in particular to introduce the plastics material pre-form into the blow moulding station and also to remove it again. In this case a guide cam 9 is also arranged inside the clean room 20. It would also be possible, however, for a portion 11 below the individual blow moulding stations 8 to be brought out of the clean room 20.

The conveying device 2 can have still further elements which are arranged above the clean room 20.

In this case the carrier 26 is arranged in a fixed manner on a holding body 29 and this holding body in turn is movable with respect to the floor 13. In this case the reference number 27 relates to a further sealing device which in this area too seals off the regions 13 and 29 which are movable with respect to each other.

The reference number 5 relates to a stretch bar which is movable with respect to the blow moulding station in order to stretch the plastics material pre-forms 10 in their longitudinal direction. In this case a slide 12 opposite which the stretch bar is movable in the direction Y is arranged on the cover 17. The reference number 21 relates to a further holding means for this slide 12 of the stretch bar 5.

It is evident that specific regions of the stretch bar are both outside the clean room 20 and inside the clean room 20 during the blow moulding procedure. For this purpose it is possible for a protective device such as a folding bellows to be provided outside the clean room 20 or above the slide 12, the folding bellows surrounding the stretch bar 5 so that no region of the stretch bar 5 comes directly into contact with the outer environment. The reference letter U designates the (non-sterile) environment of the clean room 20. The reference number 28 designates a carrier for carrying a floor mould which likewise forms a component of the blow mould 4. This carrier is likewise movable in the direction Y in this case.

The reference number 55 relates to a sterilization device which in this case is preferably arranged in the interior of the clean room 20 and is used for the sterilization of the individual shaping stations or components of these shaping stations 8. This sterilization device 55 can act in this case upon the shaping stations 8 for example with hydrogen peroxide or another sterilization agent. In this case the sterilization device 55 can be arranged so as to be stationary and the shaping stations can move with respect to this sterilization device 55. This sterilization device or stressing device 55 can be situated on the conveying wheel 2 or on the vertical wall 18 or can be arranged so as to be generally stationary and can consist of nozzles or the like. In addition, it is advantageous for sterile air to be introduced into the clean room 20 in order to sterilize the clean room 20 by way of the aeration system.

The blow moulds (not shown) are arranged inside the blow mould carriers 6. More precisely, two blow mould carrier parts can be provided in this case which are pivotable with respect to each other and which hold one blow mould part in each case. The blow moulds can be opened by this pivoting procedure for the introduction of plastics material pre-forms and for the removal of finished, blow-moulded containers. These blow mould carriers and blow moulds are likewise arranged inside the clean room in this case.

It would also, however, be possible and preferred (other than as shown in FIG. 2) for the conveying device 2 or the carrier to have a C-shaped external periphery which also forms the outer walls of the clean room in part. In this way, this C-shaped clean room wall turns with the conveying device 2, i.e. the blowing wheel. In this embodiment the lower boundary of the clean room is arranged at a distance from the floor 13 and moves relative to the floor. In this way, the clean room can be made even smaller than as shown in FIG. 2. In this case it is preferable for this C-shaped profile of the conveying device, which forms both an inner wall and a lower and upper cover of the clean room here, to be sealed off only with respect to the outer wall of the clean room. This outer wall is preferably arranged in a stationary manner in this case.

FIG. 3 is a perspective illustration of a blow moulding station 8. The latter has two blow mould carrier parts 6a and 6b which are pivotable towards each other or with respect to each other about a pivot axis A in order to open and to close the blow mould.

The reference number 80 designates a locking mechanism as a whole, which is used for locking the blow mould halves during an expansion of the plastics material pre-forms. This locking mechanism 80 has in this case a first locking element 82 and a second locking element 84. This first locking element 82 is arranged in this case on the second mould carrier part 66 so as to be pivotable by means of a first bearing device (not shown in detail here). For locking purposes, suitable projections of the first locking element 82 engage in recesses in the second locking element 84. This second locking element 84 is arranged in this case in a rotationally fixed manner on the first mould carrier part 6a. The reference number 92 relates to a cam roller which is arranged on a swivel lever 94 and which is used to effect a pivoting movement of the first locking element 82. The two mould carrier parts 6a and 6b are arranged so as to be pivotable with respect to a geometrical pivot axis A, in which case corresponding bearing devices are also provided for this purpose.

Figure 4:
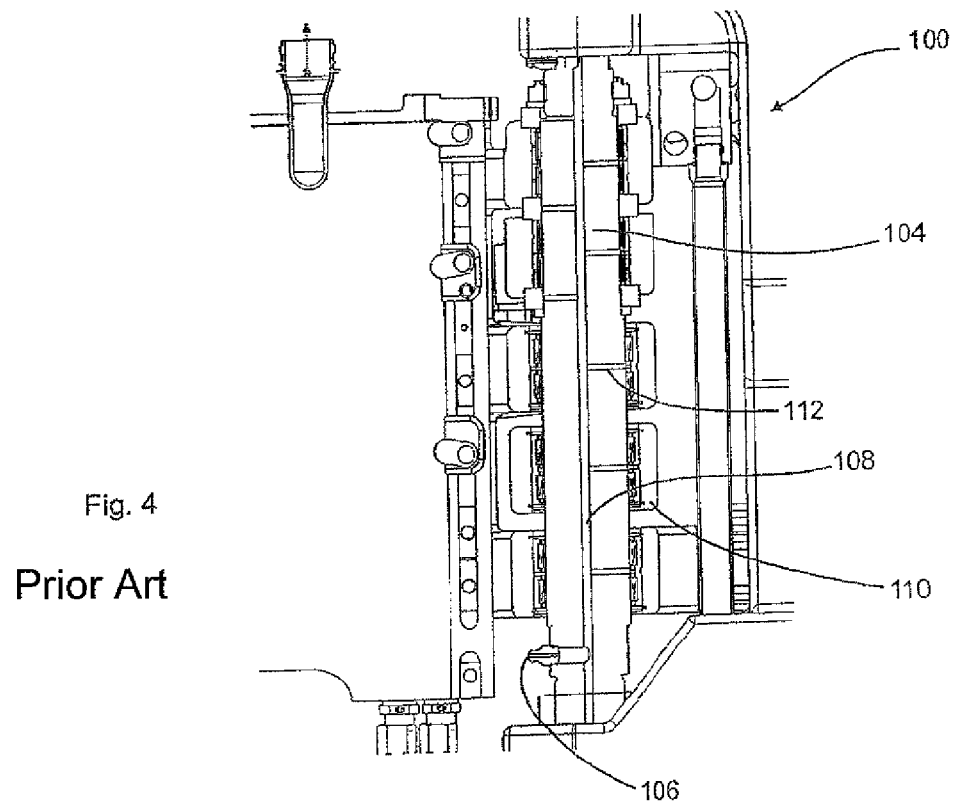
FIG. 4 shows a bearing device according to the prior art.

FIG. 4 indicates a bearing device according to the prior art. In this case a main shaft 104 is provided here to which a lubricant can be supplied by way of a lubrication nipple 106. This lubricant passes by way of a duct 108 and a plurality of subsidiary ducts 112 to the respective bearing points 110. In these cases, however, the escape of grease occurs, which is undesired in particular in aseptic applications.

Figure 5:
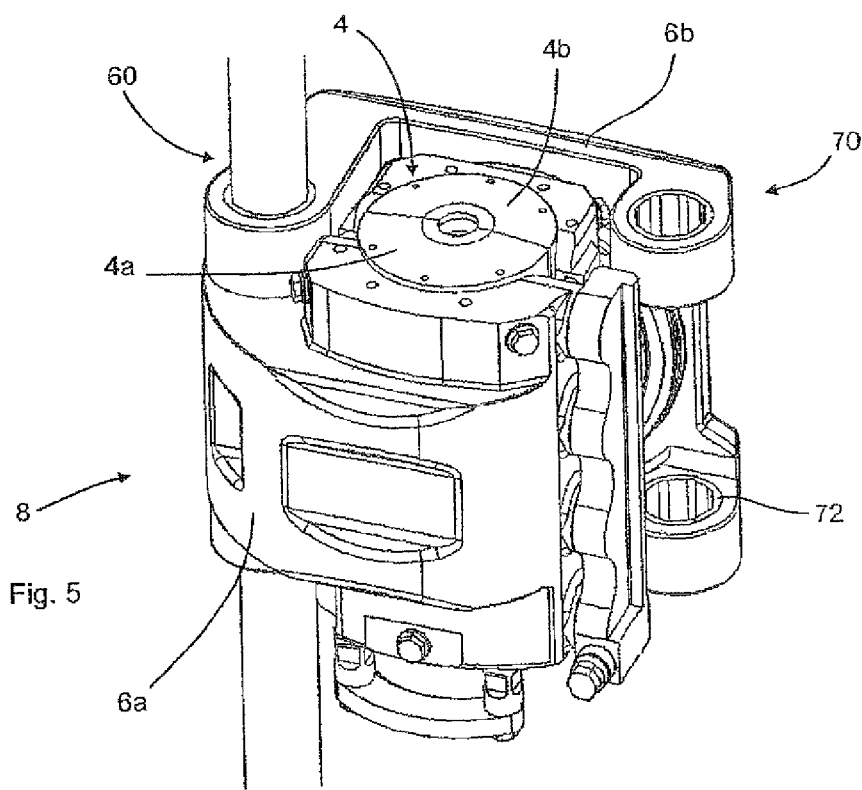
FIG. 5 shows a blow moulding station according to the invention.

FIG. 5 shows a blow moulding station according to the invention. In this case the two mould carriers 6a, 6b are again evident as well as also the blow mould parts 4a 4b which are received by the latter and which jointly form the blow mould 4. The reference number 60 designates a first bearing device for the movable mounting of the blow mould parts 6a, 6b. The reference number 70 designates a second bearing device for mounting a locking element (not shown). The reference number 72 designates a bearing body which is described in detail more precisely.

Figure 6A:
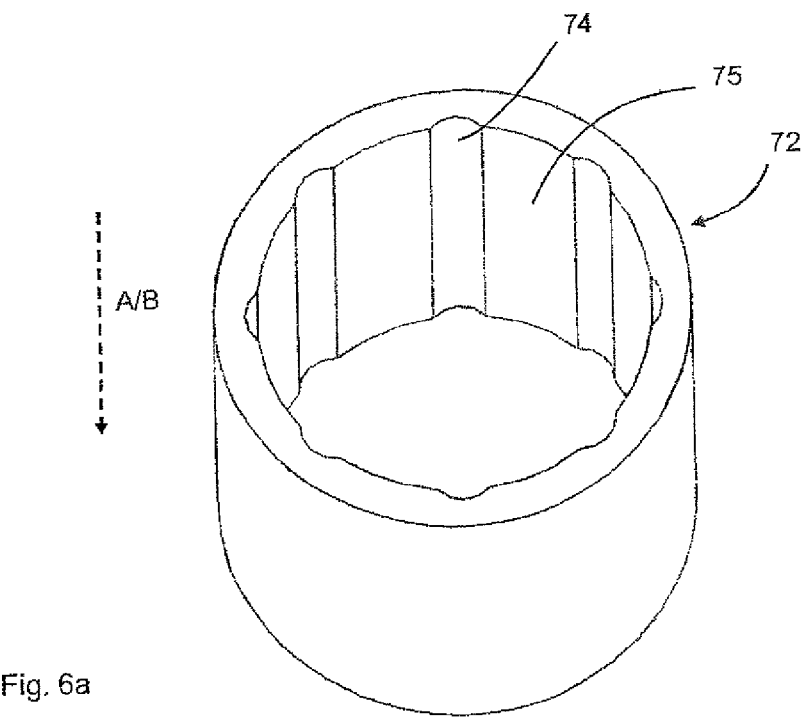
FIGS. 6a-d show four arrangements of a bearing body.

FIG. 6a shows a possible arrangement of a bearing body 72 of this type. In this arrangement this bearing body has a plurality of grooves 74 which are arranged in each case on the inner wall 75 of the bearing body 72. The shaft to be mounted opposite this bearing body 72 is situated inside the bearing body 72. The grooves 74 extend at a right angle in this case, i.e. also along the geometrical axis A or B respectively, with respect to which the pivoting of the locking element is carried out. The recesses 74 are designed in this case in the form of round recesses. In this way, it is possible to combat the accumulation of dirt. Also in this way, a sterilization is possible along the axis A or B respectively, i.e. the sterilization agent can also pass through the bearing device 70 and the bearing element 72 respectively with the aid of this recess.

Figure 6B:
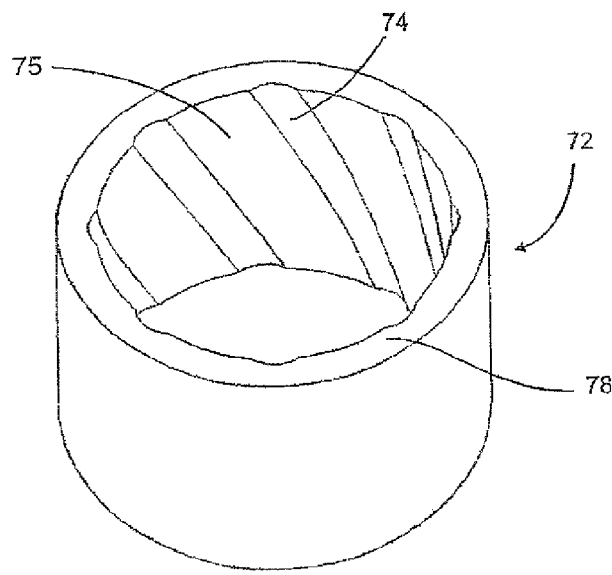

FIG. 6b shows a further arrangement for a bearing element 72. This too, as in the case of the arrangement shown in FIG. 6a, is an axial bearing. In this case too, grooves 74 are again provided, the grooves 74 extending not in the longitudinal direction, but obliquely. In this way too, a through passage of a sterilization agent is possible. The reference number 78 designates in turn a wall of the bearing element 72.

Figure 6C:
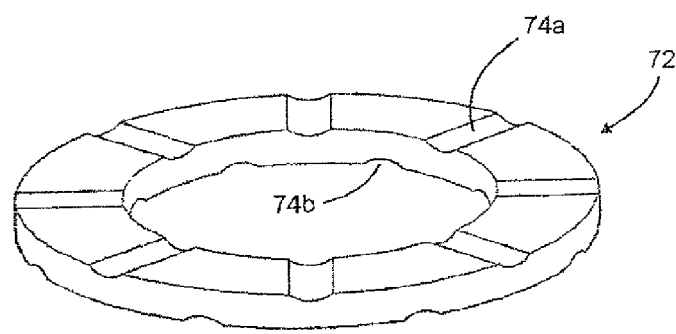

FIG. 6c shows a further arrangement of a bearing element, in which case grooves 74a, 74b are again provided which here are arranged on the respective upper and lower faces of the bearing element 72. These ducts too permit a through passage of cleaning agents.

Figure 6D:
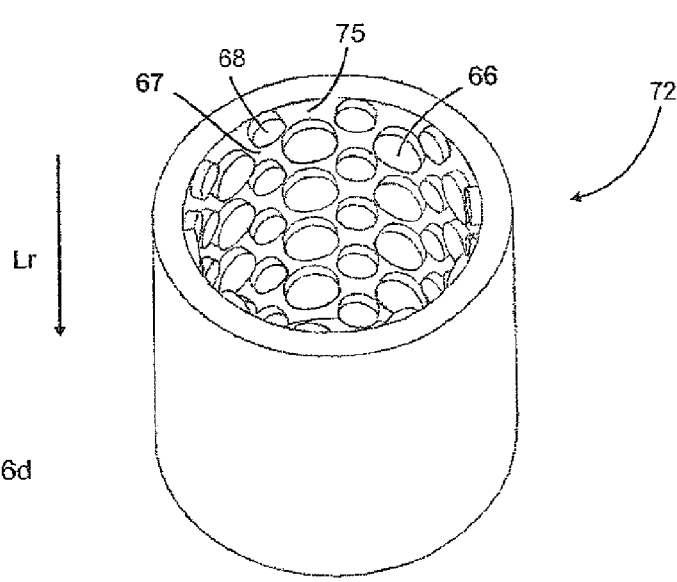

FIG. 6d is a further illustration of a bearing element 72. In the case of this bearing element too, a smooth inner surface 75 is not provided here, but a plurality of first projections 66 and second projections 68 which all project radially towards the inside in each case. In addition, ducts 67 through which a sterilization medium can also flow are formed between these individual projections 66 and 88. In this case a first row of the projections 66 is formed here and, offset contrary thereto both in the peripheral direction and in the longitudinal direction Lr, a second row of second projections 68. In this way too, a highly advantageous design of the bearing body 72 is achieved.

Figure 7:
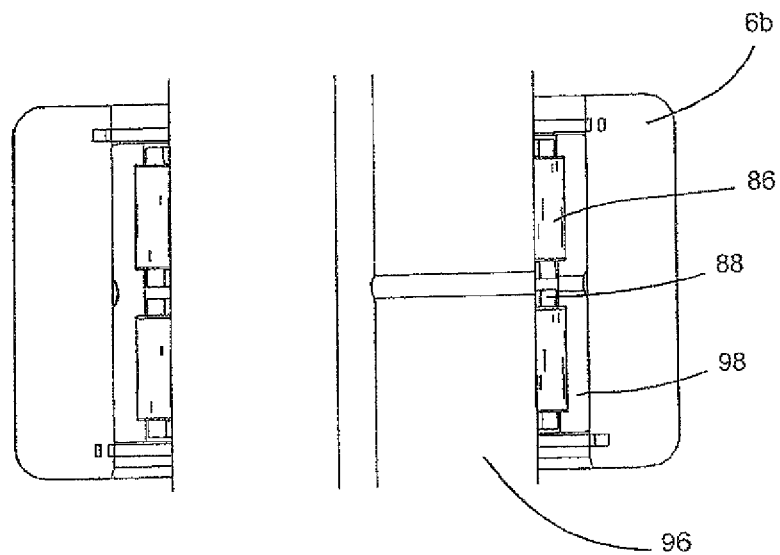
FIG. 7 shows a further arrangement of a bearing device according to the invention.

FIG. 7 shows a further arrangement of a bearing device according to the invention. In this case a pivot shaft 82, which is arranged so as to be pivotable with respect to a mould carrier part 6b, is again provided here as well. With this arrangement the bearing device has roller bodies 86, such as for example needles, which produce the rotating mounting of the mould carrier part 6b with respect to the shaft 82. The reference number 88 designates diagrammatically an injected plastics material in which these roller bearings are embedded. In this case this plastics material 88 already contains a substantial portion of the lubricant, so that the rotational movement of the roller bodies 86 is lubricated in this way. The reference number 98 designates an outer ring of the bearing device which, as mentioned, rotates with respect to the shaft 96.

In this way it would be possible for example for the plastics material to be a thermoplastic synthetic resin compound which contains a lubricant and which can contain for example between 2 and 40% by volume of a lubricating oil or an oiliness improver. In this case this synthetic resin compound can additionally contain components such as a flame retardant, an anti-static agent, an antioxidant or even antibacterial agents, such as for example silver ions. It is preferable for the plastics material compound to contain the lubricant with between 5 and 25% of its total mass or its total volume.

In this way it would be possible for PE or a thermoplastic material, in which a lubricant or grease is incorporated, to be used as a carrier substance of the material. In this case it would be conceivable for the portion of the carrier to be between 20% and 40% and preferably 30%, and for the portion of the lubricant to be accordingly between 60% and 80% and preferably 70%. It is therefore preferable for roller bearings to be used in which the interspaces are filled with a material which provides the lubrication only to the body, i.e. the roller bearing itself.

Figure 8:
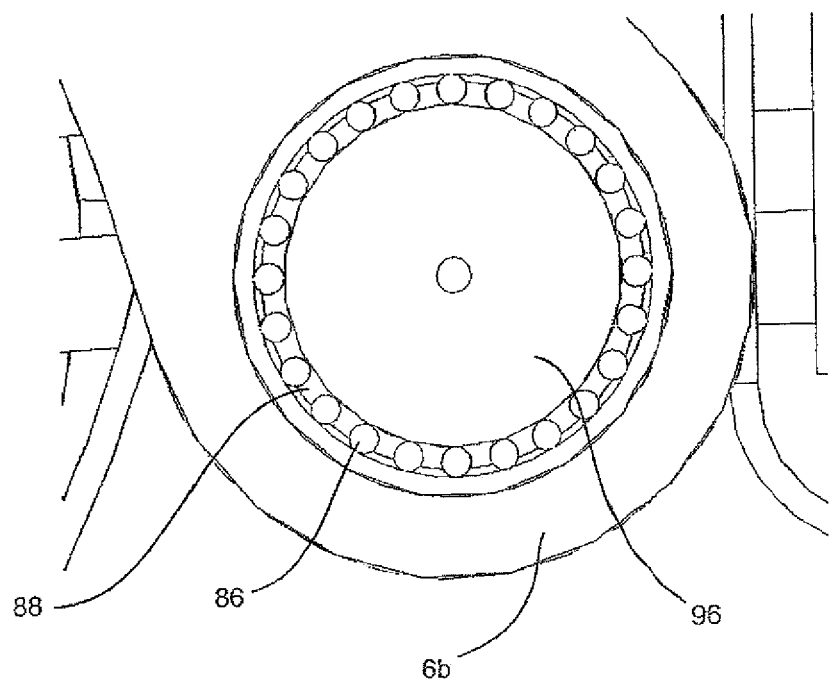
FIG. 8 is a view to illustrate a pivoting movement.

FIG. 8 is a further view to illustrate the pivoting movement of the mould carrier part 6b. In this case a plurality of roller bodies which are embedded in the injected plastics material 88 are again evident. In this way, a bearing device designed in such a manner acquires its bearing characteristics essentially over its entire service life.

Figure 9:
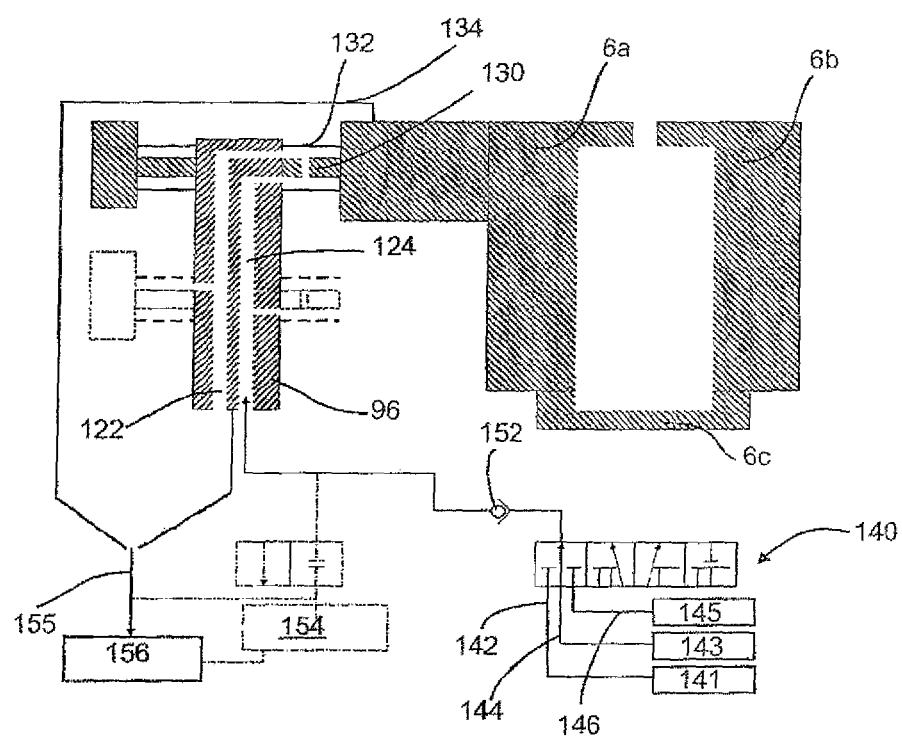
FIG. 9 shows a further embodiment of a blow moulding station with a cleaning facility

FIG. 9 shows a further embodiment of a blow moulding station and, in this case in particular, possibilities of cleaning the shaft 96. It is noted that this arrangement can also be used in the case of conventional blow moulding stations, i.e. in particular in the case of blow moulding stations according to the preamble of claim 1 (with or even without a locking mechanism). In particular, the features shown in FIG. 9 are also capable of being combined with conventional bearing devices.

The Applicants reserve the right to claim separate patent protection for arrangements of this type.

In the case of the embodiment shown in FIG. 9, ducts 122, 124 through which one or more (liquid and/or gaseous) cleaning or sterilization media can flow are formed in the interior of the shaft. The reference number 140 designates a valve device, in this case a multiple-way valve, by way of which at least one cleaning agent and preferably a multiplicity of cleaning agents can be supplied to the shaft. More precisely, the shaft can have supplied to it, starting from a first reservoir 145 a foam cleaning agent by way of a supply line 146, starting from a second reservoir 143 a sterilization agent such as for example peracetic acid or hydrogen peroxide by way of a supply line 144 and starting from a third reservoir 141 compressed air for blowing out and drying by way of a supply line 142. It is thus advantageous for the apparatus to have a valve device 140 by way of which the supply of at least one cleaning agent or sterilization agent into the shaft 96 and/or the bearing device, advantageously the supply of at least two cleaning agents or sterilization agents and in a particularly preferred manner the supply of three cleaning agents or sterilization agents into the bearing device can be controlled. The choice of the cleaning agent or sterilization agent is preferably made in such a way that the material of the bearing is damaged as little as possible.

The reference number 152 designates a further valve element which in this case is designed in the form of a non-return valve and which prevents substances from being able to pass back again into the reservoirs 141, 143 and/or 145.

The respective cleaning or sterilization agent can thus be fed into a first duct 124 formed in the interior of the shaft 96 and can be brought as far as a slide bearing bush 130 of the bearing device 60. A second duct formed in the shaft 96 is used for returning the cleaning or sterilization medium. Expressed more precisely, the cleaning or sterilization medium can be removed by way of a removal line 155 into a collecting container 156. The reference number 154 relates to a vacuum pump which is optionally capable of being provided and with which the cleaning agent or residues of the cleaning or sterilization agent can be removed from the supply line or from the removal line respectively. In the same way, a return into the corresponding reservoirs and for a reuse of the cleaning or sterilization agent is possible.

In addition, it would also be possible for a lubricant or grease to be supplied to the bearing device 60 or the shaft, as known per se in the prior art. In this case it is advantageous for the same ducts which are used for the supply of the cleaning agent also to be used for the supply of the lubricant. A lubricant can then be supplied for a time (in particular in working operation) and a cleaning agent can be supplied for a time (in particular in a cleaning operation) to the bearing device by way of the valve device 140.

The reference numbers 132, 134 relate to optional sealing devices which demarcate the bearing device or the shaft 96 respectively from the clean room. In the preferred embodiment shown in FIG. 9 it is thus advantageous for at least one sealing device to be provided which is associated with an opening mechanism of the blow mould carrier and which screens this opening mechanism off from a conveying path of the containers. In addition, it would also be advantageously possible in the case of the embodiment shown in FIG. 9 or in the case of one of the other embodiments for a sealing device for a non-sterile room to be provided on at least one of the components closing off the blow mould (such as in particular but not exclusively the stressing device or blow moulding nozzle respectively, the blow mould or the blow mould base).

In addition, it would also be conceivable for a sealing device to be provided between a drive device of components such as the blow moulding nozzle, the stretch rod, the mould carrier, a locking means and/or the base (which drive device is arranged outside the clean room) and the clean room with the individual blow moulds.

In this case various embodiments would be conceivable for this sealing device.

In this way, this sealing device could be designed in the form of a folding bellows. In this case this folding bellows could comprise a material or could be produced from a material which contains elastic plastics material such as EPDM, Teflon, natural rubber, elastomers, rubber or steel, a diaphragm bellows or a corrugated bellows or combinations thereof.

In addition, it would be possible for the sealing device to touch the blow mould carriers of two adjacent blow moulding stations. In this way, in the case of metals the sealing device could possibly be welded. In addition it would be possible for the sealing device or the folding bellows respectively to be arranged in part between the blow mould carrier halves of a blow moulding station.

It would also be possible for the sealing device to extend through an axis of rotation of two mould carrier halves. In this case it would also be possible for two shafts rotating one in the other to be used for moving the blow mould carrier halves.

The locking mechanism for the blow mould carrier parts can also be designed in this case in the form of a cup-type locking means which for example is attached to the blow mould carrier parts from below or from above. It would also be possible for a cup-type locking means of this type to be attached to the blow mould carrier parts from above and for a second cup-type locking means of this type to be attached to the blow mould carrier parts from below. In this case for example this cup-type locking means can be a carrier element holding the base part of the blow mould or a carrier element holding the blow moulding nozzle (or stressing device), but it can also be designed independently of the base mould or the stressing device respectively.

It is advantageous for the blow mould carriers to be produced from high-grade steel and, in a particularly preferred manner, to have smooth surfaces. In addition, a plastics material centring means can also be provided for the blow mould halves.

The cleaning shown in FIG. 9 for the shaft 96 can also be provided in a corresponding manner for the coupling levers of the blow mould. Instead of the bearing devices described above, it is also possible in particular, as in the embodiment shown in FIG. 9, for bearing devices such as high-grade steel roller bearings, ceramic roller bearings and/or plastics material slide bearings to be used. The drive devices for moving the stressing device, the stretch rod, the blow mould carriers, the locking means and/or the base part can also be designed in part or completely in the form of electrical and/or magnetic drive devices. It is advantageous for at least one of these drive devices to be arranged outside the clean room It would also be possible for any desired combinations of the aforesaid drive devices to be arranged outside the clean room. In addition, an electrical or magnetic opening of the locking means would also be possible.

The embodiment shown in FIG. 9 can also, however, be operated in the case of non-aseptic applications, without a clean room. In addition, it would be possible for the mould carrier shaft to be arranged not outside the clean room, as shown in FIG. 9, but (at least in part) inside the clean room. The corresponding bearing devices could also be arranged inside the clean room.

The Applicants reserve the right to claim all the features disclosed in the application documents as being essential to the invention, insofar as they are novel either individually or in combination as compared with the prior art.

LIST OF REFERENCES 1 shaping device, apparatus
2 conveying wheel, conveying device
4 bearing device, blow mould
4a, 4b blow mould parts
5 stretch bar
6 clean room
6a, 6b blow mould carrier parts
8 blow moulding station, shaping station
9 guide cam
10a containers
10 plastics material pre-forms
11 follower device, portion
12 slide
13 floor
17 cover
18 wall
19 lateral wall
20 clean room
21 further holding means
22 supply device
23 holding device
24 removal device
25 sealing device
26 carrier
27 further sealing device
28 carrier
29 holding body
30 heating device
31 heating elements
32 sterilization device
34 conveying device
36 transfer unit
37 conveying wheel
40 filling device
42 transfer unit
44 conveying unit
50 plant
55 sterilization device
60 first bearing device
66, 68 projection
67 ducts
70 second bearing device
72 bearing body, bearing element
74 groove, recess
74a, 74b grooves
75 inner surface
78 wall
80 locking mechanism
82 first locking element
84 second locking element
86 roller body
88 projection, injected plastics material
92 cam roller
94 pivot lever
96 shaft
98 outer ring
100 apparatus (prior art)
104 main shaft
106 lubricant
108 duct
110 bearing point
112 subsidiary duct
122, 124 ducts in shaft 96
130 slide bearing bush
132, 134 sealing device
140 valve device
141, 143, 145 reservoir
142, 144, 146 supply line
152 valve element
154 vacuum pump
155 removal line
156 collecting container
A, B pivot axis
Lr longitudinal direction, clean room
U non-sterile environment
X axis
Y direction

The invention claimed is:

1. An apparatus for the shaping of plastics material pre-forms into plastics material containers with a plurality of blow moulding stations which are arranged on a movable carrier, wherein the blow moulding stations have blow moulds which in each case have at least two blow mould parts and which in their interior form a cavity inside which the plastics material pre-forms are capable of being expanded, and wherein the blow moulding stations have in each case stressing devices which act upon the plastics material pre-forms in order to expand them with a flowable medium, wherein the blow mould parts are arranged in each case on blow mould carriers and the blow mould carriers are movable with respect to one another in order to open and close the blow mould and the blow moulding stations have a locking mechanism in order to lock the blow mould carriers together in a closed state, and this locking mechanism has a first locking element and a second locking element which is movable with respect to the first locking element, wherein at least one first bearing device is provided for the movable mounting of the blow mould carriers with respect to each other and/or at least one second bearing device is provided for the movable mounting of the first locking element with respect to the second locking element, and at least one of these bearing devices is designed in the form of a slide bearing without lubricant or in the form of a bearing which is injection moulded at least in part from a plastics material between bearing parts movable relative to each other.

2. The apparatus according to claim 1, wherein the apparatus has a clean room inside which the blow moulding stations are conveyed, and this clean room is separated from the environment by at least one wall.

3. The apparatus according to claim 1, wherein at least one blow mould carrier is arranged so as to be pivotable with respect to a first pre-set pivot axis (A) and the first bearing device is used for supporting this pivoting movement.

4. The apparatus according to claim 1, wherein at least one locking element is mounted so as to be pivotable with respect to a second pivot axis (B) and the second mounting device is used for supporting this pivoting movement with respect to the second pivot axis (B).

5. The apparatus according to claim 1, wherein at least one mounting device has at least one recess on at least one bearing face.

6. The apparatus according to claim 5, wherein at least one bearing device has a plastics material as the material of the slide bearing.

7. The apparatus according to claim 6, wherein at least one material of at least one bearing device either is chosen from a group of plastics materials, in particular thermoplastic plastics materials or thermosetting plastics materials, or contains metallic materials or combinations thereof or the like.

8. The apparatus according to claim 1, wherein a lubricant for the bearing device is contained in a plastics material which acts as a material for at least one bearing device.

9. The apparatus according to claim 1, wherein at least one bearing device acts as a radial bearing and/or as an axial bearing.

10. The apparatus according to claim 1, wherein at least one bearing device is capable of having a flowable sterilization agent flow through it.

* * * * *